United States Patent
Sheng et al.

(10) Patent No.: US 10,448,008 B1
(45) Date of Patent: Oct. 15, 2019

(54) MOTION ESTIMATION BASED ON BLOCK LEVEL BILATERAL FILTER AND LOCAL MOTION MODEL

(71) Applicant: Pixelworks, Inc., Portland, OR (US)

(72) Inventors: Xiaojie Sheng, Shanghai (CN); Neil Woodall, Newport Beach, CA (US); Yue Ma, Pleasanton, CA (US); Guohua Cheng, Shanghai (CN)

(73) Assignee: PIXELWORKS, INC., Portland, OR (US)

(*) Notice: Subject to any disclaimer, the term of this patent is extended or adjusted under 35 U.S.C. 154(b) by 795 days.

(21) Appl. No.: 13/918,457

(22) Filed: Jun. 14, 2013

Related U.S. Application Data

(63) Continuation of application No. 13/873,939, filed on Apr. 30, 2013, now abandoned.

(51) Int. Cl.
*H04N 19/583* (2014.01)

(52) U.S. Cl.
CPC .............................. *H04N 19/00733* (2013.01)

(58) Field of Classification Search
CPC ............................................... H04N 19/00733
USPC ........................................... 375/240.16
See application file for complete search history.

(56) References Cited

U.S. PATENT DOCUMENTS

| | | | | |
|---|---|---|---|---|
| 6,735,249 B1* | 5/2004 | Karczewicz | ......... | H04N 19/147 375/240 |
| 2009/0190037 A1* | 7/2009 | Chang | .................... | H04N 19/56 348/699 |
| 2012/0013796 A1* | 1/2012 | Sato | ..................... | H04N 7/0127 348/441 |
| 2012/0051638 A1* | 3/2012 | Kawai | ................... | G06K 9/3241 382/170 |
| 2012/0075535 A1* | 3/2012 | Van Beek | .............. | H04N 5/145 348/699 |
| 2012/0294362 A1* | 11/2012 | Sikora | .................... | H04N 19/82 375/240.14 |
| 2013/0188715 A1* | 7/2013 | Seregin | .................. | H04N 19/52 375/240.16 |
| 2013/0279588 A1* | 10/2013 | Wu | .................. | H04N 19/00684 375/240.16 |

* cited by examiner

*Primary Examiner* — William C Vaughn, Jr.
*Assistant Examiner* — Jae N Noh
(74) *Attorney, Agent, or Firm* — Miller Nash Graham & Dunn LLP

(57) ABSTRACT

A method of estimating motion in video display data includes dividing a frame of the video display data into blocks, generating at least two motion models for a current block from motion models of neighboring blocks to the current block, and selecting one of the motion models based upon a similarity of the motion model that minimizes differences between corresponding blocks in reference frames to the current block.

17 Claims, 3 Drawing Sheets

MOTION ESTIMATION BASED ON BLOCK LEVEL BILATERAL FILTER AND LOCAL MOTION MODEL

CROSS REFERENCE TO RELATED APPLICATION

This application is a continuation of, and claims priority to U.S. patent application Ser. No. 13/873,939, filed Apr. 30, 2013, which is incorporated herein in its entirety.

BACKGROUND

Frame interpolation creates an image frame from neighboring images. The neighboring images may be fields in an interlaced video format, used to form a frame of data, or neighboring frames of a soon-to-be-created frame. Typically, frame interpolation has the goal of increasing the number of frames. For example, one may desire to convert from a 24 frame per second rate, such as in film, to 120 frames per second for a video display device such as a liquid crystal display.

In the simplest approach, one could increase the frame rate by repeating the most recent frame until the next frame is ready for display. However, this does not account for moving objects which may appear to jump from frame to frame and have flickering artifacts. Motion estimation and motion compensation techniques may alleviate some of these issues. These techniques rely upon motion vectors to shift the image data for the moving object to the correct position in interpolated frames, thereby compensating for the motion of the object.

Therefore, true motion estimation techniques are very important in frame interpolation. Accurate motion estimation generates high quality frame interpolation results. Considering the computational cost for real time application, most motion estimation algorithms are block based motion estimation that uses block level SAD (sum of absolute differences) value and spatial and temporal smoothness constraint as the criteria. However, the block level motion estimation cannot deal with object level motion and non-translational motion well. To solve these two problems, different solutions have been proposed.

One possible solution is to use a segmentation method, typically used to generate object level motion. For example, if the images contain a car, accurate segmentation would result in the car body segmented from the wheel. The motion vectors would then define a motion model for each segment. Segmentation is expensive from a computational standpoint and the expense is increased by the need to find the correct motion model for each segment. The motion model for the car body would be one type, such as translational, and the motion model for the wheel would be a more complex model, such as affine.

A low cost approach that integrates both block and local motion would be helpful.

DETAILED DESCRIPTION OF THE EMBODIMENTS

Figure 1:
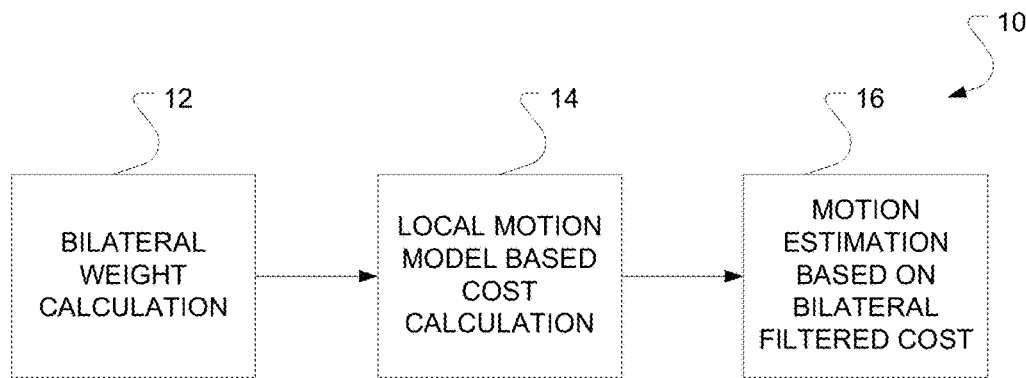
FIG. 1 shows a flowchart of an embodiment of a method of motion estimation.

FIG. 1 shows a flowchart of an embodiment of a method to do true motion estimation. The method of motion estimation 10 integrates bilateral filter and a local motion model. This method uses module 12 for bilateral weight calculation and module 14 for the local motion model based cost calculation. Module 16 integrates the bilateral weight calculation and bilateral filtered cost to determine motion estimation for a block.

Figure 2:
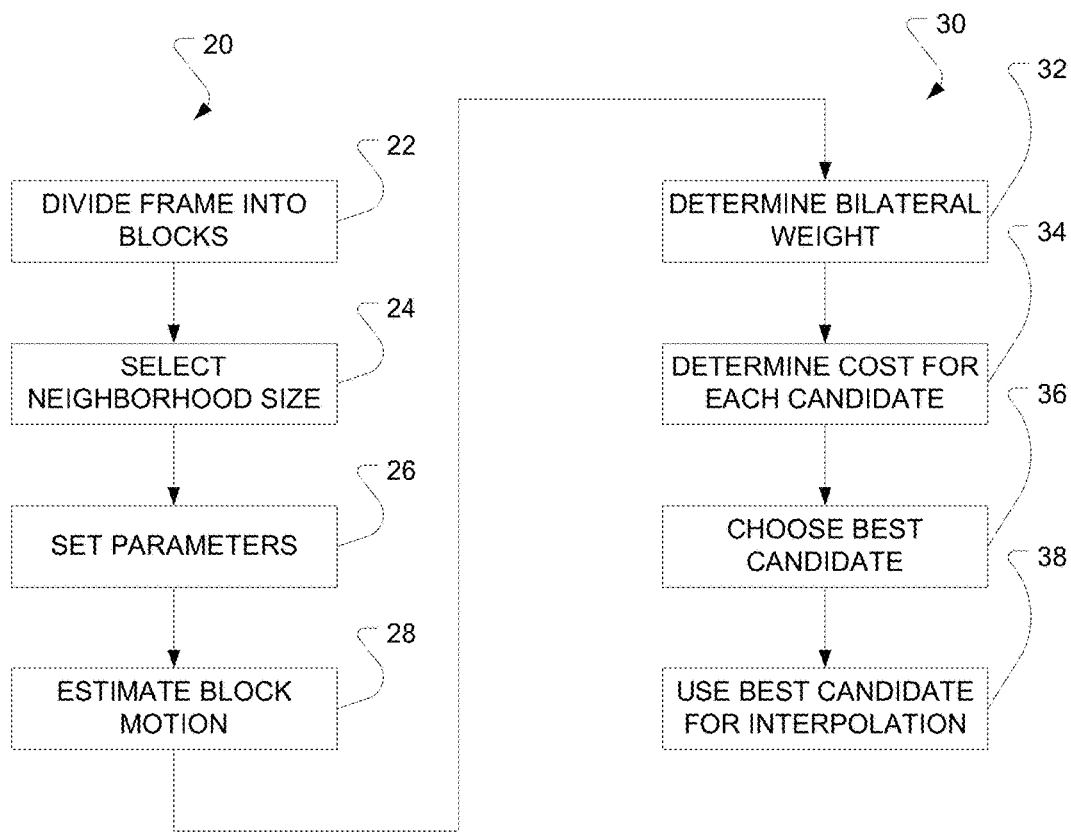
FIG. 2 shows a more detailed flowchart of an embodiment of a method of motion estimation.

FIG. 2 shows a more detailed flowchart of an embodiment of a method of performing motion estimation. This embodiment has two parts, an initial part 20 and an iterative portion 30. In the initial part, a frame of video image data becomes the focus of the process. Generally, the motion detected in this frame will be used to interpolate a new frame of data between the current frame and the next frame.

The frame of video image data is divided into an X by Y array of blocks of pixels at 22. The notation used here of (x,y) designates the block residing at a particular x value and a particular y value. The iterative portion 30 will perform several analyses on a current block, often using a neighborhood of blocks around the current block. The notation for the current block is (0,0) with the block prior to that block in a raster scan being designated as negative in the vertical direction (y<0) or on the same row (y=0) and to the left (x<0) and their position relative to the current block. The notation for blocks after the current block is also relative to the current block but their coordinates are positive. The neighborhood size is left up to the system designer, but one should note that using higher numbers of neighbors results in more accurate estimations, but higher computational costs. The size of the neighborhood, also called the support region, is generally a number of blocks N×N, and is selected at 24.

At 26, the process sets parameters for a motion model to estimate local motion for each block in the frame. In the embodiments here, the motion models will be selected from between a translational model and an affine model. The translational model typically uses only motion in the horizontal and vertical directions. The affine model typically uses six parameters, including the two from the translation model. While these models are the two discussed here, there is no limitation intended to any particular motion model and none should be implied. The determination of the actual parameter values will be discussed in more detail later, but the initialization process defines which set of parameters to use.

Once the motion estimation model is selected, the motion for the blocks in the frame is estimated according to a set of motion model candidates selected. Generally, the selection of the motion model candidate will be based upon the complexity of the patterns in the video frame and the computational resources available. The translational model can handle simple x-y motion translation, lacking finer detail, but has low computational demands. The affine model can handle more complex motion, but requires much higher computation capacity.

The motion model candidates are used to calculate the motion for each block in the neighborhood. The motion is used to then calculate a Sum of Absolute Differences (SAD) for each block. If, for example, eight motion model candidates are created, for each block in the neighborhood, the process calculates eight SAD values. Each candidate motion vector has different values for a1 through a6.

As part of selecting the motion model candidate, the 'search' range for the motion model may also be defined. In one embodiment, the search range is defined as a 'full' search method. This is the range from which the parameters for candidate motion model will be selected. The embodiments here use one of two methods for motion model candidate selection. The first is full search method. For full search, one first defines the search range for every parameter in the motion model. For example, for translational motion model, we should define the search range as follows:

a1=[K1, K2]

a2=[K3, K4]

A larger search range will take more computational time but can cover more motion condition. So the K1, K2, K3, K4 is selected according to the motion complexity and computational cost. For the affine motion model, the full search method is similar but the search range is defined for six parameters rather than two.

Another motion candidate selection method is based on the 3-D recursive strategy. The motion model candidate for the current block can be taken from the spatial and temporal already calculated motion models and their random updates. The process changes the parameters of the model to find better motion models to describe the local motion. For example, to find the motion model candidate M(x,y) for N*N support region centered at B(0,0), the process takes the already calculated motion model of temporal corresponding block Bt(0,0) and its spatial top-left block B(−1,−1) and top-right block B(−1,+1) as candidates. It also takes the random updates of the spatial motion estimation candidates as new candidates. The random updates are done on every parameter of motion model by adding small random value on the parameter.

The number of spatial, temporal and random update candidates can be selected according to the tradeoff between computational cost and pattern complexity. The search range of the full search method is often very large and takes much time in searching all candidates but the true motion model is always included in the search range. And the search range for 3-D recursive method is very small (usually no more than 8 candidates), but if the object motion model change fast, the temporal, spatial and random update candidates are not able to catch the true motion model for current block. So the motion model candidate selection method also depends on the computational cost and pattern complexity.

Figure 3:
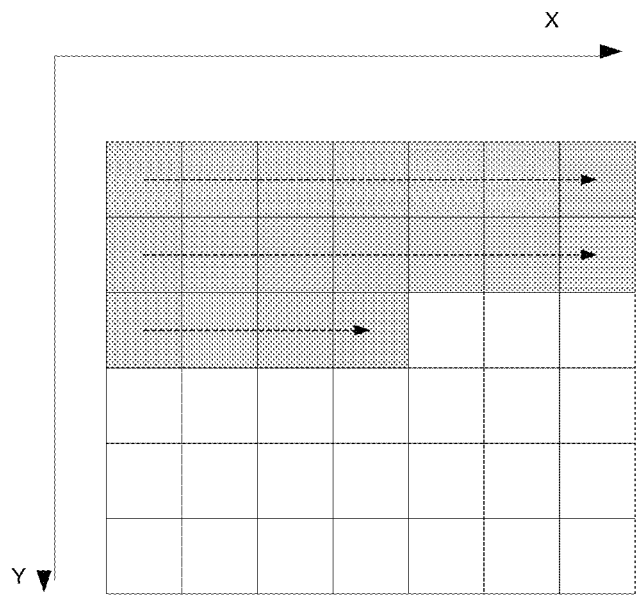
FIG. 3 shows an example of a frame of video image data divided up into blocks.

Once the above portion of the method is completed with the selection of the search range at 26, the process uses the selected motion model to estimate the motion for each block, as shown in FIG. 3. In FIG. 3, the blocks are processed in a raster scanned fashion as shown by the arrows. In the figure, the gray blocks have already been processed and the white blocks are awaiting processing. Once all of the motion is estimated, the process moves into the iterative portion 30, briefly discussed above with regard to FIG. 1. The process will be repeated using each successive block in the frame as the current block until all blocks have been processed.

In the embodiment of FIG. 3, the current block undergoing motion estimation is block A, The process takes all its N*N neighboring blocks of as a support region as illustrated in FIG. 3, 7*7 neighboring blocks as an example. As the process calculates the block motion in a spatial recursive way as shown in FIG. 3, when the process reaches block A, all the motion estimations for the gray blocks have already been calculated. The process defines each block as B(x,y), in which x and y means the horizontal and vertical coordinate of the block. And the central Block A is defined as B(0,0). For example, in FIG. 4, Block B is defined as B(−2,−2) and Block C is defined as B(2,1).

The bilateral weight for block B(x,y) in N*N neighboring blocks represents the possibility that B(0,0) and B(x,y) belong to a same object. A larger weight means the B(x,y) and B(0,0) are more likely to be part of the same object. The bilateral weight is calculated as follows:

(1) Calculate the image content difference between B(x,y) and B(0,0). The content difference can be simply the SAD (Sum of Absolute Difference) value between B(x,y) and B(0,0) or calculated by other more complicated feature like HOG (Histogram of Oriented Gradient). This content difference is defined as Diff_content (x,y).

(2) Calculate the spatial distance between B(x,y) and B(0,0) by Diff_space(x,y), which can be approximated by abs(x)+abs(y) to represent the spatial distance between two blocks.

After the Diff_content and Diff_space are calculated, the bilateral weight for block (x,y) can be calculated by:

weight_bilateral(x,y)=exp(−k1*Diff_content(x,y)−k2*Diff_space(x,y))

in which k1 and k2 are two registers to adjust the weight. The larger the Diff_content(x,y) and Diff_space(x,y) is, the smaller the weight_bilateral(x,y).

The weight bilateral(x,y) can evaluate the possibility that B(x,y) belongs to the same object as B(0,0). The larger the weight, B(x,y) is more likely to be in the same object and belongs to the same local motion model as B(0,0). For the B(0,0) itself, the weight_bilateral(0,0)=1.

After determining the bilateral weight at 32, the process determines the cost for each candidate motion model, where the candidate motion model are those from the neighborhood of the current block and are candidates to be used as the motion model for the current block.

The cost is a value to evaluate the accuracy of the motion vector. Higher cost means the accuracy of the motion vector is low. After defining the cost function E, the motion estimation process is to find a motion vector or model which can minimize the function. Ordinary block based motion vector estimation uses block level SAD as the cost function to evaluate the quality of motion vectors. But simply block level SAD is not able to take the object level information and more complex motion model into consideration. It simply assumes that the pixels in the same block have the same motion value and the block motion is translational, and that the motion vector of the adjacent block as a motion vector candidate for the current block. This assumption is not always enough for calculating accurate motion fields in some complex patterns. To overcome the disadvantage of simple block level SAD cost function, the embodiments here take the region information and non-translational motion model into consideration and use a cost function to evaluate the quality of the motion model instead of a motion vector.

As in module 12 of FIG. 1, the bilateral weight have been calculated to represent the regional object information, now in module 14 all the blocks in N*N support region are assumed to belong to the same object as B(0,0) and take the local motion model candidates into consideration. Finally these two parts are integrated as a whole bilateral filtered cost function to calculate motion in Module 16.

In module 14, the cost function includes motion discontinuity cost and SAD cost. When the process calculates the cost function for B(0,0) in FIG. 3, it takes its neighboring 7*7 blocks as support region.

Figure 4:
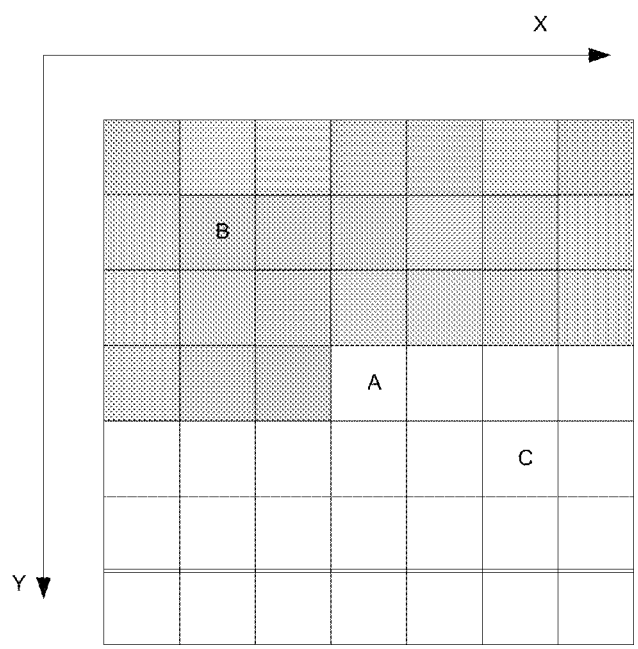
FIG. 4 shows an example of a current block within a neighborhood of blocks within a frame of video image data.

The process may assume that the block motion in the same object belongs to the same motion model, so if the gray blocks of FIG. 4 and block A belong to the same object, the already calculated motions of the gray blocks will constrain the motion for block A and will encourage the motion of block A to belong to the same motion model of the gray blocks. The below discussion takes two common motion models for example. The motion model in the support region is defined as $M_c(x,y)$ and for every motion model candidate $M_c(x,y)$ the process calculates the motion vector of $B(x,y)$ by $M_c(x,y)$.

The translation model supposes an object move from one frame to another frame without deformation. So every part of the object moves in the same velocity. The model is the most simple motion model. But as its computational cost is low, it is adopted in most motion estimation algorithm. The translation model $M(x,y)$ can be expressed by:

$$U(x,y)=a_1$$

$$V(x,y)=a_2$$

in which, $U(x,y)$ and $V(x,y)$ are horizontal and vertical motion for block $(x,y)$.

The affine model supposes an object move from one frame to another frame with linear deformation. The velocity depends on the position $(x,y)$. The affine model can deal with most object motion with six parameters. The affine model $M(x,y)$ can be expressed by:

$$U(x,y)=a_3*x+a_4*y+a_1$$

$$V(x,y)=a_5*x+a_6*y+a_2$$

The translation model may be considered a special case of affine model (a3, a4, a5 and a6 equal zero). In module 14, the process first chooses a motion model for the N*N region illustrated in FIGS. 3 and 4. The criterion of choosing the motion model depends on the complexity of pattern and computational resource. The translational model can only deal with translational motion but its computational cost is low. The affine model can deal with more complex object motion but its computational cost is high.

After selecting the motion model, the process defines the cost function for the motion model. The cost function is defined by ECM (x, y)(0,0). It is the final cost function for a motion model candidate $M(x,y)$ for the N*N support region centered at B(0,0). A large ECM (x, y)(0,0) value means the current motion model candidate $M(x,y)$ is not suitable for current N*N support region centered at B(0,0). Different from the original block SAD based motion estimation algorithm, the present cost function is calculated by summing all the cost of neighboring blocks which belong to the support region of B(0,0) because the process simply assumes the N*N support region of B(0,0) belongs to the same object as B(0,0).

The original block SAD based method simply uses block level SAD as cost function to choose the best motion candidate. In our method, the block level cost function is turned into a region level cost function and the block motion vector candidate is turned to a region motion model candidate. And finally, after the motion model is selected for the support region centered at B(0,0), the motion for B(0,0) can be simply calculated by M(0,0). Note, that the motion vector calculation from a motion model at B(0,0) is simply Mx =a1 and My=a2.

The motion discontinuity cost is then defined. The process has assumed that all the N*N neighboring blocks of B(0,0) is in the same object and belongs to the same local motion model, the discontinuity cost is used to encourage the motion model candidates that are consistent with the already calculated block motions in its N*N neighbor. The Cost_motion is defined as the discontinuity cost. For current block B(0,0), Cost_motion(x,y) means the discontinuity cost considering the difference between motion model candidate $M(x,y)$ and the motion at $B(x,y)$. For the translational motion model $M(x,y)$: $U(x,y)=a_1$ $V(x,y)=a_2$, the Cost_motion(x,y) can be calculated as follows:

If $(y<0) \| (y=0 \&\& x<0)$ Cost_motion$(x,y)$=abs($U(x,y)-a_1$)+abs($V(x,y)-a_2$)

Else Cost_motion(x,y)=0 in which $(y<0) \| (y=0 \&\& x<0)$ refers to the blocks whose motion has already been calculated, such as the gray blocks in FIGS. 3 and 4.

In the above formula, for already calculated motions, one can calculate Cost_motion(x,y). For blocks whose motion has not been calculated, one sets the Cost_motion(x,y)=0. If the motion candidate does not match the already calculated motions at B(x,y), the Cost_motion(x,y) will be large.

Another cost for the motion candidate is the ordinary SAD cost: Cost_SAD. For a motion candidate $U(x,y)=a_1$ $V(x,y)=a_2$, one defines Cost_SAD (x,y) as the SAD cost of B(x,y) with the motion $U(x,y)=a_1$ $V(x,y)=a_2$. The SAD cost Cost_SAD (x,y) is calculated as follows in translation motion model. The process fetches the corresponding block $B_r(x,y)$ in reference frame (or frames) for B(x,y) by motion $U(x,y)=a_1$ $V(x,y)=a_2$ and calculates the sum of absolute difference of the two blocks as the Cost_SAD(x,y). Someone skilled in the art can see how the same can be applied to two reference frames when B(x,y) is at an intermediate time between the two reference frames.

Different from the translational motion model, the affine motion model needs six variables to describe the motion. The affine model can describe more complex object motion than the translational model. The affine motion model candidate $M(x,y)$ in the support region is: $U(x,y)=a_3*x+a_4*y+a_1$ $V(x,y)=a_5*x+a_6*y+a_2$. Similar to the translational model, Cost_motion(x,y) means the discontinuity cost that evaluates the difference between $M(x,y)$ and already calculated motion at $B(x,y)$. For current motion model candidates: $U(x,y)=a_3*x+a_4*y+a_1$ $V(x,y)=a_5*x+a_6*y+a_2$, the Cost_motion(x,y) is calculated as follows:

If $(y<0) \| (y=0 \&\& x<0)$

Cost_motion$(x,y)$=abs($U(x,y)-a_3*x-a_4*y-a_1$) +abs($V(x,y)-a_5*x-a_6*y-a_2$)

Else

Cost_motion(x,y)=0

The process defines Cost_SAD (x,y) as the SAD cost of B(x,y) with the motion model $M(x,y)$: $U(x,y)=a_3*x+a_4*y+a_1$ $V(x,y)=a_5*x+a_6*y+a_2$. And the Cost_SAD (x,y) is calculated as follows in affine motion model. The process fetches the corresponding block $B_r(x,y)$ in reference frame for B(x,y) by motion $U(x,y)=a_3*x+a_4*y+a_1$ $V(x,y)=a_4*x+a_5*y+a_2$ and calculates the sum of absolute difference of $B_r(x,y)$ and B(x,y) as the Cost_SAD(x,y). The minimization of the differences between the current block and the corresponding blocks in the reference frames is a factor in the selection of the appropriate motion model.

After the calculation of Cost_motion(x,y) and Cost_SAD(x,y), one defines Cost(x,y) as the final cost of B(x,y) in the N*N support region of B(0,0). The process calculates Cost(x,y) as:

Cost(x,y)=Cost_motion(x,y)+k3*Cost_SAD(x,y)

in which k3 is a parameter to tune the blending weight between SAD cost and discontinuity cost.

After getting the Cost(x,y) for every block in the support region, the cost function of a motion model candidate E(0,0) for is calculated by accumulating all Cost(x,y) as:

$$E_{M(x,y)}(0, 0) = \sum_{x=-N}^{+N} \sum_{y=-N}^{+N} \text{Cost}(x, y)$$

As the process assumes the blocks in N*N support region belong to the same object as B(0,0), one can sum all the Cost(x,y) together to get the E(0,0) as the above formula. The process can then select the best motion model $M_S(x, y)$ which minimizes the E(0,0). After the best motion model has been calculated, the motion for current block B(0,0) can be simply calculated as $M_S(0,0)$. The cost as calculated assumes that all the blocks in the region belong to the same object. To eliminate this assumption, the process weights each cost(x,y) for each motion model candidate by the likelihood that the block B(x,y) is part of the same objects as B(0,0).

After calculating the bilateral weight in module 12 of FIG. 1 and Cost(x,y) in the support region in module 14, module 16 integrates them together to calculate the motion model cost based on bilateral filter weights.

The target of motion estimation is to estimate the motion of block B(0,0) by an N*N support region. The process has calculated the bilateral weight weight_bilateral(x,y) for every block in the support region to evaluate the possibility that the B(x,y) and B(0,0) are in the same object and belong to the same local motion model. The discussion describes that when one assumes the B(x,y) and B(0,0) belong to the same motion model, how to calculate the Cost(x,y) and E(0,0) in the support region. Now the two parts are calculated and calculate the bilateral filtered cost as:

Cost_bilateral(x,y)=Cost(x,y)*weight_bilateral(x,y)

One can find from the formula that if B(x,y) and B(0,0) belong to the same object as assumed, the weight_bilateral(x,y) should be 1 and Cost_bilateral(x,y) is equal to Cost(x,y). If B(x,y) and B(0,0) are not in the same object, weight_bilateral(x,y) should be very small so the Cost_bilateral(x,y) will also close to 0. In this condition, bilateral filtered Cost(x,y) will have little influence in the cost function E(0,0). The meaning of the above function is that one only takes the Cost(x,y) of B(x,y) which is in the same object of B(0,0) into consideration when calculate the cost function E(0,0). The previous formula converts to:

$$E'_{M(x,y)}(0, 0) = \sum_{x=-N}^{+N} \sum_{y=-N}^{+N} \text{Cost}(x, y) * \text{bilateral}(x, y)$$

Figure 5:
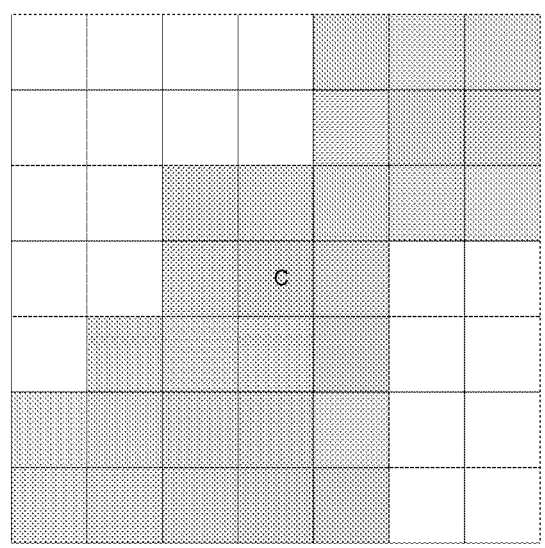
FIG. 5 shows an example of a resulting set of blocks belonging to a same object.

With the bilateral filtered cost, there is no assumption that the blocks in the N*N support region belong to the same object and the fixed N*N support region can be considered to be an adaptive support region which depends on real object shape. As illustrated in FIG. 5, 7*7 blocks were chosen as the fixed support region, but only gray blocks are similar with the central block and have large bilateral weight. Other blocks have very small bilateral weight. Therefore, only the Cost(x,y) of the gray blocks can influence the value of E(0,0) for they belong to the same object with B(0,0). After $E'_{M(x,y)}(0,0)$ is calculated, the best motion candidate is selected as follows and motion calculation for current B(0,0) is calculated as $M_S(0,0)$.

$$M_S(x, y) = \underset{M(x,y)}{\text{argmin}} \{E'_{M(x,y)}(0, 0)\}$$

An advantage of the above embodiments is that it integrates the bilateral filter and local motion model and takes full advantage of the two tools. They first use the bilateral filter to generate an object shape based adaptive support region and then calculate the best local motion model for the region. Without bilateral filter, the local motion model cannot be used because the process cannot get object information in a fixed N*N region. Without the local motion model, one cannot deal with complex object movement in a fixed region. Integration of the two tools enables a more accurate motion than the simple block level motion estimation method.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of estimating motion in video display data, comprising: dividing a frame of the video display data into blocks; selecting at least two motion model candidate for a current block from motion models used in neighboring blocks;

modifying one or more of the at least two selected motion model candidates to generate at least two motion model candidates for the current block from motion models of blocks in a predetermined supporting region;

determining a cost for each of the motion model candidates for each block in the predetermined supporting region based on a difference between pixels in a first frame and pixels in a second frame with a relative position determined by each of the motion model candidates;

finding a content based weight for each block in the predetermined supporting region based on a similarity of content with the current block;

finding a distance based weight for each block in the predetermined supporting region based on a spatial distance of the block in the predetermined supporting region relative to the current block;

combining the content based weight and the distance based weight for each block in the predetermined supporting region together;

applying the combined weights to the cost for each motion model candidate for each block in the predetermined supporting region to produce weighted costs for each block in the predetermined supporting region;

summing the weighted cost for each motion model candidate for each block in the predetermined supporting region to create a total cost for each motion model candidate; selecting a motion model from the motion model candidates based upon the total cost; and calculating a motion vector for the current block based on the selected motion model.

2. The method of claim 1, wherein selecting the motion model is further based upon a similarity of content of the video display data in the current block to content of the video display data of a neighboring block from which the motion model is selected.

3. The method of claim 2, wherein selecting the motion model is further based upon the current block to the neighboring block of the selected motion model.

4. The method of claim 3, further comprising weighting the motion model candidates prior to selecting the motion model.

5. The method of claim 4, wherein weighting the motion model candidates comprises bilateral weighting.

6. The method of claim 1, wherein generating at least two motion model candidates comprises making random changes to parameters of motion model candidates for neighboring blocks.

7. The method of claim 1, wherein determining the cost comprises finding a difference in a motion vector calculated for a block and a motion vector calculated for the block using a motion model candidate and using the difference to set the cost.

8. The method of claim 1, wherein determining the cost comprises finding a sum of absolute differences for the block based upon the motion model candidate.

9. The method of claim 1, wherein weighting each of the blocks in the predetermined supporting region comprises using a sum of absolute differences between pixel values in a block in the predetermined supporting region and the current block.

10. The method of claim 1, wherein weighting each of the blocks in the predetermined supporting region comprises using a histogram of gradients.

11. The method of claim 1, wherein weighting each of blocks in the predetermined supporting region comprises using a distance between the current block and each of the blocks in the predetermined supporting region.

12. The method of claim 1, wherein combining the content based weight and the distance based weight for each block in the predetermined supporting region together includes multiplying the content based weight and the distance based weight for each block in the predetermined supporting region.

13. The method of claim 1, wherein the predetermined supporting region is rectangular.

14. The method of claim 1, wherein applying the combined weights to the cost for each motion model candidate for each block in the predetermined supporting region includes multiplying the combined weights to the cost for each motion model candidate for each block in the predetermined supporting region.

15. A method of estimating motion in video display data, comprising:
dividing a frame of the video display data into blocks;
selecting at least two motion model candidate for a current block from motion models used in neighboring blocks;
modifying one or more of the at least two selected motion model candidates to generate at least two motion model candidates for the current block from motion models of blocks in a predetermined supporting region;
determining a cost for each of the motion model candidates for each block in the predetermined supporting region based on a difference between pixels in a first frame and pixels in a second frame with a relative position determined by each of the motion model candidates;
determining a weight for each block in the predetermined supporting region based on a likelihood of the block in the predetermined supporting region belonging to a same object in the video display data as the current block and a spatial distance of the block in the predetermined supporting region relative to the current block;
applying the weight to the cost for each motion model candidate for each block in the predetermined supporting region to produce a weighted cost for each block in the predetermined supporting region;
summing the weighted cost for each motion model candidate for each block in the predetermined supporting region to create a total cost for each motion model candidate;
selecting a motion model from the motion model candidates based upon the total cost; and calculating a motion vector for the current block based on the selected motion model.

16. The method of claim 15, wherein selecting the motion model is further based upon a similarity of content of the video display data in the current block to content of the video display data of a neighboring block from which the motion model is selected.

17. The method of claim 16, wherein selecting the motion model is further based upon the current block to the neighboring block of the selected motion model.

* * * * *